United States Patent [19]

Manka

[11] Patent Number: 5,675,926
[45] Date of Patent: Oct. 14, 1997

[54] BOVINE DECOY APPARATUS

[76] Inventor: William W. Manka, 411 E. 4th, Alma, Kans. 66401

[21] Appl. No.: 663,514

[22] Filed: Jun. 13, 1996

[51] Int. Cl.⁶ .................................................. A01M 31/00
[52] U.S. Cl. ........................ 43/1; 43/2; D22/125; 135/901
[58] Field of Search ......................... 43/1, 2; D22/125; 135/901; 40/586

[56] References Cited

U.S. PATENT DOCUMENTS

| | | | |
|---|---|---|---|
| D. 334,627 | 4/1993 | Morris | D25/16 |
| 586,145 | 7/1897 | Sievers, Jr. | 43/2 |
| 3,052,054 | 9/1962 | Littleton | 43/1 |
| 3,509,891 | 5/1970 | De Bolt | 135/901 |
| 3,642,318 | 2/1972 | Avant | 135/901 |
| 3,690,334 | 9/1972 | Miller | 43/1 |
| 4,186,507 | 2/1980 | Stinnett | 43/1 |
| 4,683,672 | 8/1987 | Davis | 43/1 |
| 4,794,717 | 1/1989 | Horsmann | 135/901 |
| 4,829,694 | 5/1989 | Oasheim | 43/1 |
| 5,301,706 | 4/1994 | Jones | 135/104 |
| 5,373,863 | 12/1994 | Prizio | 135/97 |
| 5,414,950 | 5/1995 | Johnson, Jr. | 43/1 |
| 5,572,823 | 11/1996 | Savaria | 43/2 |

*Primary Examiner*—Jeanne Elpel

[57] ABSTRACT

An animal decoy apparatus includes a life size, simulated animal decoy unit, such as a life size bovine animal or cow. The cow includes a head portion, a body portion, and a tail portion. More specifically, the animal decoy apparatus includes a frame assembly and a pair of decoy units connected to the frame assembly. Each decoy unit includes a window. The pair of decoy units are spaced apart from one another by the frame assembly so that a person can position oneself between the pair of decoy units. One or more transverse struts are connected between the pair of decoy units at a position below the frame assembly. Seat units can be connected to the transverse struts. One or more gun racks may be connected to the frame assembly adjacent to the windows in the decoy units. Padded handle members are connected to the frame assembly to ease carrying of the apparatus from place to place.

14 Claims, 3 Drawing Sheets

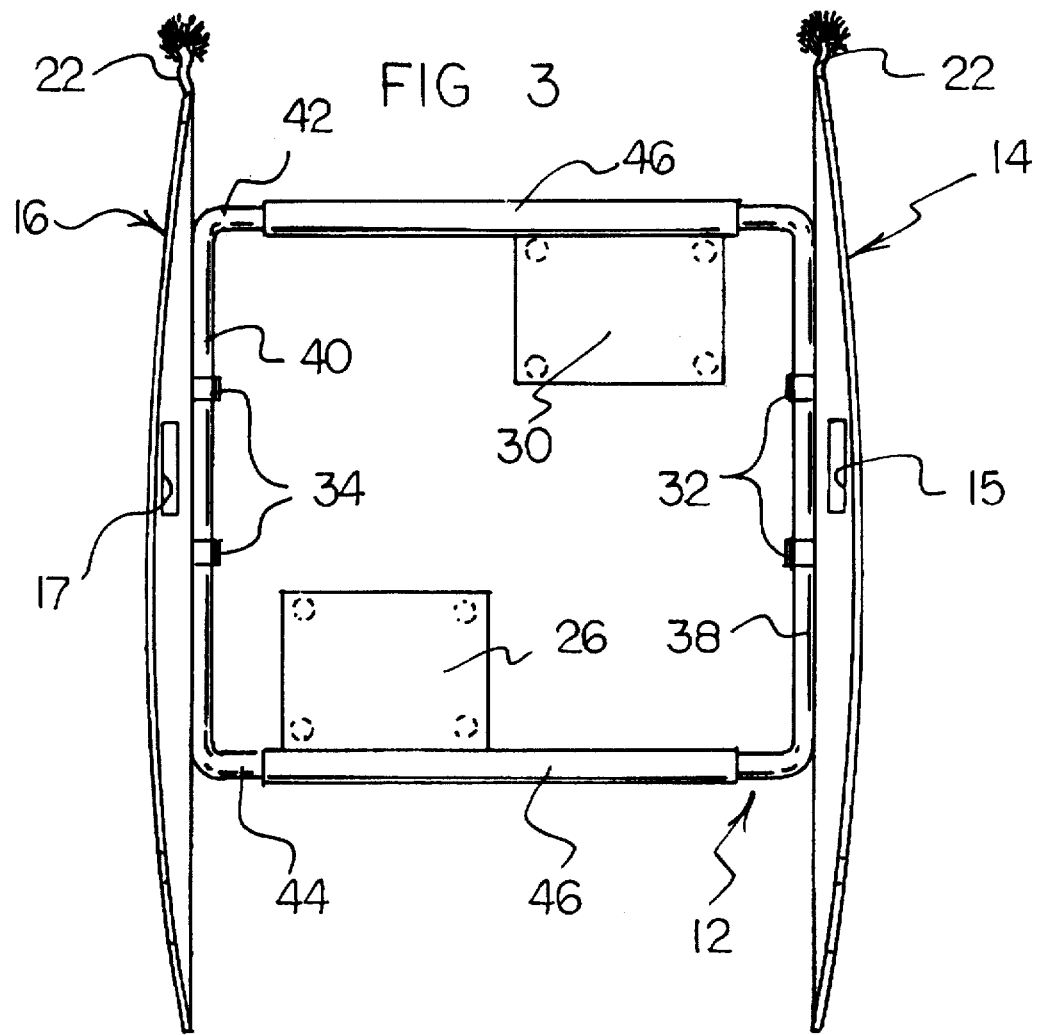
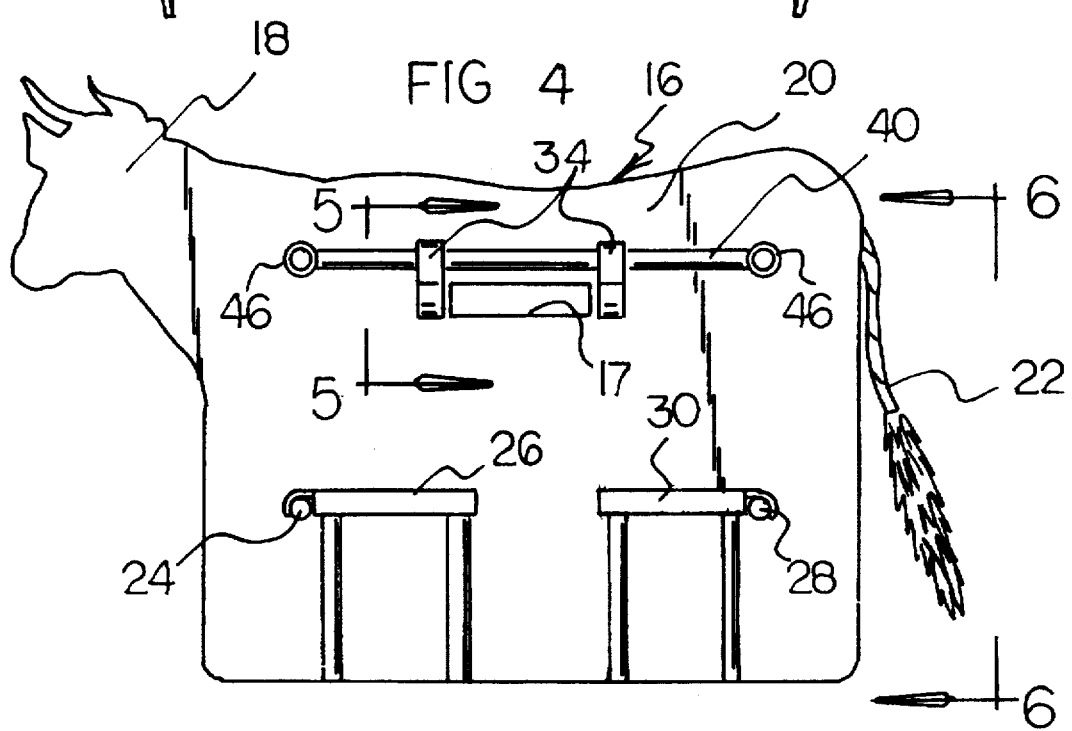

BOVINE DECOY APPARATUS

BACKGROUND OF THE INVENTION

1. Field of the Invention

The present invention relates generally to decoy devices and, more particularly, to decoy devices especially adapted for shielding hunters from the view of animals.

2. Description of the Prior Art

In the arts of hunting and photography of wildlife, in order to avoid scaring off the wildlife, it is often desirable for the hunter or photographer to hide behind some sort of camouflage. Throughout the years, a number of innovations have been developed relating to camouflage for hunters, and the following U.S. patents are representative of some of those innovations: U.S. Pat. Nos. 4,186,507, 4,829,694, 5,301,706, 5,373,863, 5,414,950, and U.S. Pat. No. Des. 334,627. Of the cited patents, only U.S. Pat. No. 4,829,694 discloses a decoy which simulates a real life creature, that is, a bird. Yet, the simulated bird is very much larger than a life size bird. Such a greater than life size decoy may not have the desired effect in preventing the scaring off of wildlife. With this in mind, it would be desirable if a decoy for wildlife simulated an animal with a life size decoy.

The choice of a life size animal decoy is important with respect to its effect in seating off wildlife. For example, a decoy simulating a deer in hunting season may not be a good idea. Hunters may mistake the decoy for a real deer and shoot at the decoy. In this respect, it would be desirable if an animal decoy simulates an animal that is not generally hunted.

Moreover, it is also important that the simulated animal selected for the decoy be an animal that will not itself tend to scare off the wildlife. A category of hunting that is widely popular is the hurtling of waterfowl such as ducks and geese. In this respect, it would be especially desirable if an animal decoy did not scare off waterfowl.

Still other features would be desirable in an animal decoy apparatus. Aside from not scaring off wildlife, the decoy should offer some comforts and conveniences to the hunter. For example, it would be desirable if the animal decoy included one or more seats for one or more hunters to sit upon. In addition, to enable a hunter to rapidly respond to observed wildlife, it would be desirable if the animal decoy included one or more gun racks.

To enable a hunter to approach wildlife that is at a distance from the hunter, it would be desirable if an animal decoy were lightweight and portable so that it could be carried and moved by a hunter while still being used as a decoy.

Thus, while the foregoing body of prior art indicates it to be well known to use camouflaged decoys for hunters, the prior art described above does not teach or suggest a simulated animal decoy apparatus which has the following combination of desirable features: (1) simulates an animal with a life size decoy; (2) simulates an animal that is not generally hunted; (3) simulates an animal that will not tend to scare off wildlife; (4) does not scare off waterfowl; (5) includes one or more seats for one or more persons to sit upon; (6) includes one or more gun racks; and (7) is lightweight and portable so that it can be carried and moved by a person while still being used as a decoy. The foregoing desired characteristics are provided by the unique bovine decoy apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an animal decoy apparatus which includes a frame assembly and a first decoy unit connected to a first frame portion of the frame assembly. The first decoy unit includes a first window. A second decoy unit is connected to a second frame portion of the frame assembly. The first decoy unit and the second decoy unit are spaced apart from one another by the frame assembly such that a person can position oneself between the first and second decoy units. The first decoy unit and the second decoy unit are in a form of a life size animal, such as a simulated bovine animal. The simulated bovine animal includes a head portion, a body portion, and a tail portion.

A first transverse strut is connected between the first decoy unit and the second decoy unit at a position below the frame assembly. A first seat unit is connected to the first transverse strut. Also, a second transverse strut is connected between the first decoy unit and the second decoy unit at a position below the frame assembly. A second seat unit is connected to the second transverse strut.

A first gun rack is connected to the frame assembly. The first gun rack is connected to the frame assembly adjacent to the first window. The second decoy unit includes a second window. A second gun rack is connected to the frame assembly. The second gun rack is connected to the frame assembly adjacent to the second window.

The frame assembly includes the first frame portion connected to the first decoy unit, the second frame portion connected to the second decoy unit, a third frame portion connected between front portions of the first frame portion and the second frame portion, and a fourth frame portion connected between rear portions of the first frame portion and the second frame portion. Padded handle members are connected to the third frame portion and the fourth frame portion.

In accordance with another aspect of the invention, an animal decoy apparatus includes a life size form of a bovine animal which can be taken alone or in connection with a frame assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved animal decoy apparatus which has all of the advantages of the prior art and none of the disadvantages.

It is another object of the present invention to provide a new and improved animal decoy apparatus which may be easily and efficiently manufactured and marketed.

It is a further object of the present invention to provide a new and improved animal decoy apparatus which is of durable and reliable construction.

An even further object of the present invention is to provide a new and improved animal decoy apparatus which is susceptible of a low cost of manufacture with regard to both materials and labor, and which accordingly is then susceptible of low prices of sale to the consuming public, thereby making such animal decoy apparatus available to the buying public.

Still yet a further object of the present invention is to provide a new and improved animal decoy apparatus which simulates an animal with a life size decoy.

Still another object of the present invention is to provide a new and improved animal decoy apparatus that simulates an animal that is not generally hunted.

Yet another object of the present invention is to provide a new and improved animal decoy apparatus which simulates an animal that will not tend to scare off wildlife.

Even another object of the present invention is to provide a new and improved animal decoy apparatus that does not scare off waterfowl.

Still a further object of the present invention is to provide a new and improved animal decoy apparatus which includes one or more seats for one or more persons to sit upon.

Yet another object of the present invention is to provide a new and improved animal decoy apparatus that includes one or more gun racks.

Still another object of the present invention is to provide a new and improved animal decoy apparatus which is lightweight and portable so that it can be carried and moved by a person while still being used as a decoy.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a top view of the embodiment of the bovine decoy apparatus of FIG. 2.

FIG. 4 is a cross-sectional view of the embodiment of the invention shown in FIG. 2 taken along lines 4—4 thereof.

DESCRIPTION OF THE PREFERRED EMBODIMENT

Figure 1:
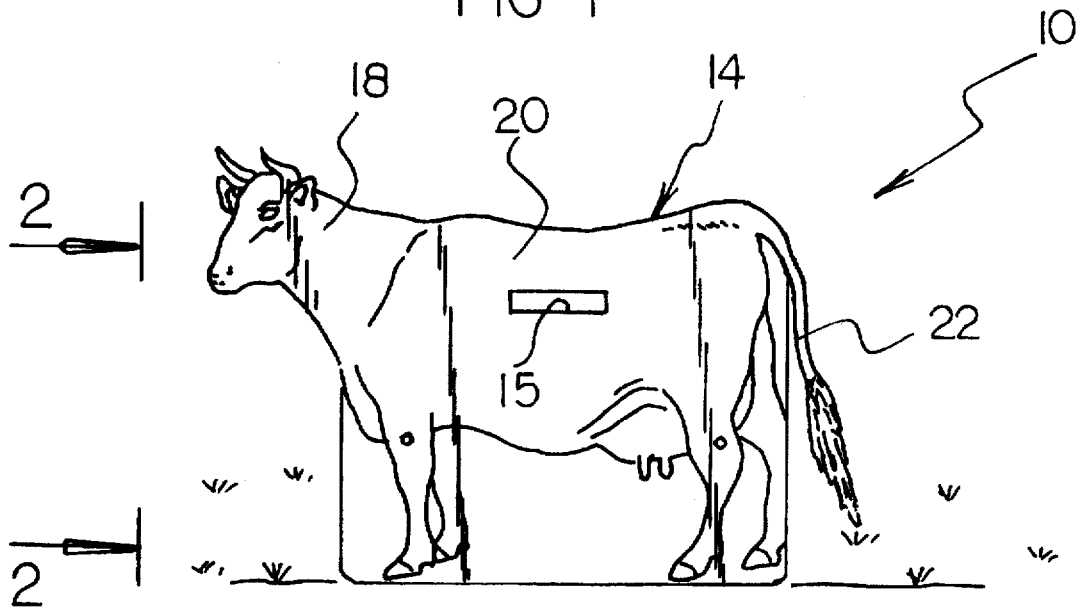
FIG. 1 is a front view showing a preferred embodiment of the bovine decoy apparatus of the invention.
Figure 2:
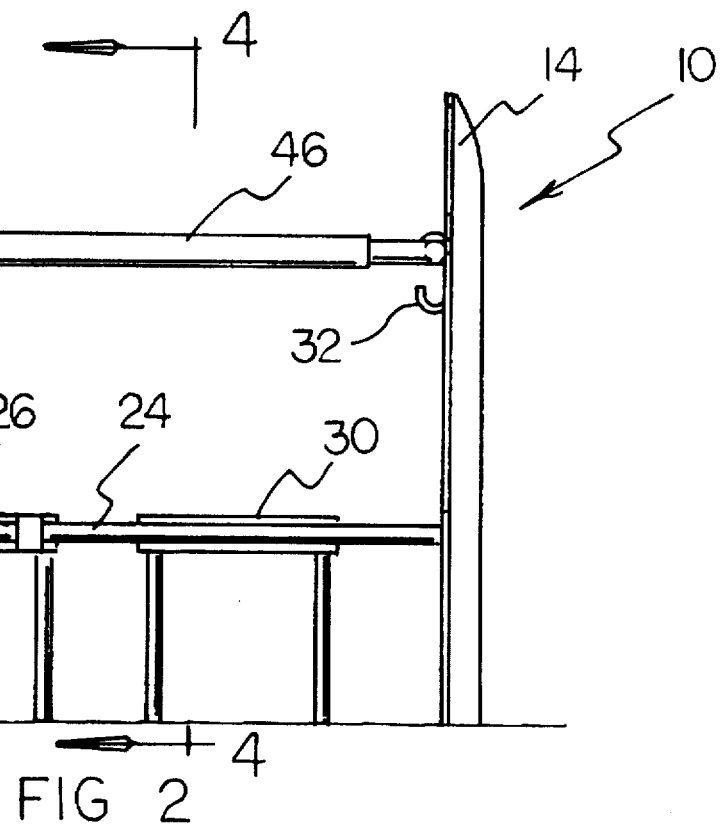
FIG. 2 is an enlarged side view of the embodiment of the bovine decoy apparatus shown in FIG. 1 taken along line 2—2 of FIG. 1.

With reference to the drawings, a new and improved bovine decoy apparatus embodying the principles and concepts of the present invention will be described.

Turning to FIGS. 1-6, there is shown an exemplary embodiment of the animal decoy apparatus of the invention generally designated by reference numeral 10. In its preferred form, animal decoy apparatus 10 includes a frame assembly 12 and a first decoy unit 14 connected to a first frame portion 38 of the frame assembly 12. The first decoy unit 14 includes a first window 15. A second decoy unit 16 is connected to a second frame portion 40 of the frame assembly 12. The first decoy unit 14 and the second decoy unit 16 are spaced apart from one another by the frame assembly 12 such that a person can position oneself between the first and second decoy units. The first decoy unit 14 and the second decoy unit 16 are in a form of a life size animal, such as a simulated bovine animal e.g. a cow. The decoy unit or units can look like different hybrids of cattle. The decoy units can be flat cutouts having a three-dimensional appearance. Also, the decoy units can have true three-dimensional features. The simulated bovine animal includes a head portion 18, a body portion 20, and a tail portion 22.

A first transverse strut 24 is connected between the first decoy unit 14 and the second decoy unit 16 at a position below the frame assembly 12. A first seat unit 26 is connected to the first transverse strut 24. Also, a second transverse strut 28 is connected between the first decoy unit 14 and the second decoy unit 16 at a position below the frame assembly 12. A second seat unit 30 is connected to the second transverse strut 28.

Figure 5:
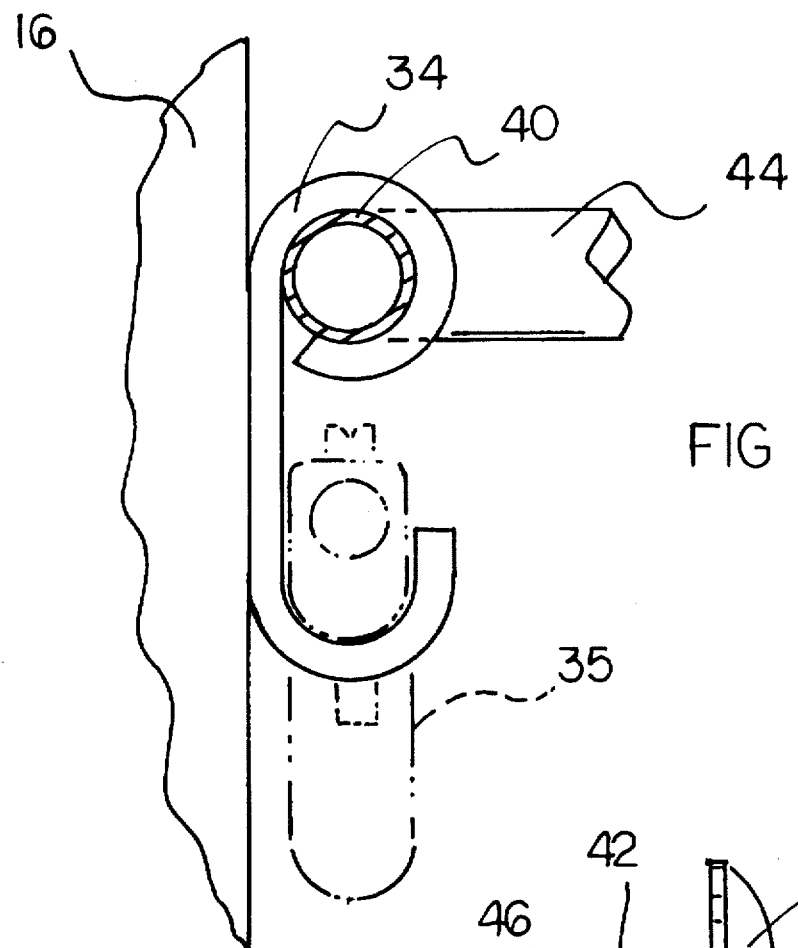
FIG. 5 is an enlarged partial cross-sectional view of the embodiment of the invention of FIG. 4 taken along line 5—5 of FIG. 4.
Figure 6:
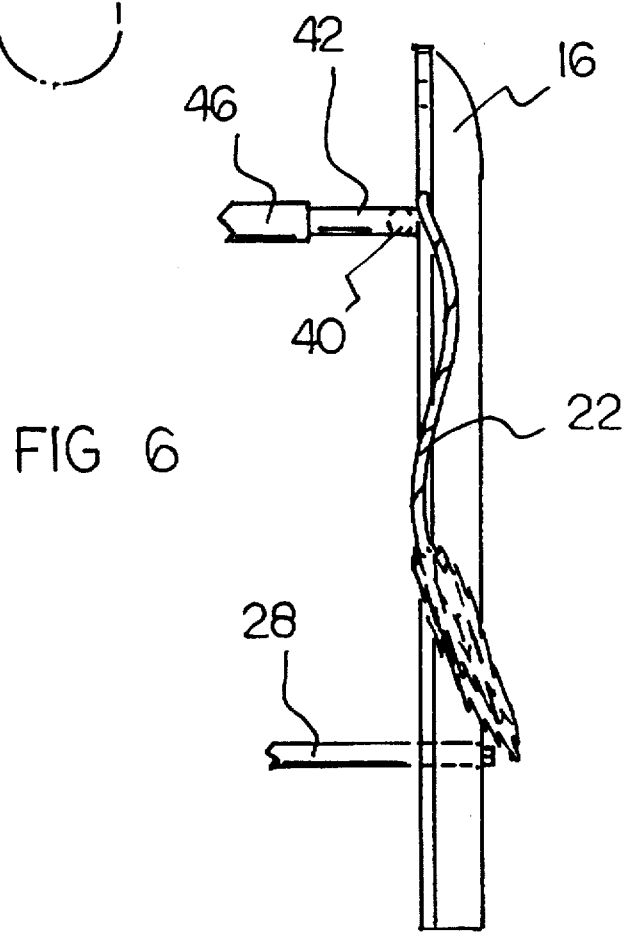
FIG. 6 is an enlarged side view of a portion of the embodiment of the bovine decoy apparatus shown in FIG. 4 taken along line 6—6 of FIG. 4.

A first gun rack 32 is connected to the frame assembly 12. The first gun rack 32 is connected to the frame assembly 12 adjacent to the first window 15. The second decoy unit 16 includes a second window 17. A second gun rack 34 is connected to the frame assembly 12. As shown in FIG. 5, a gun 35 is supported by the second gun rack 34. The second gun rack 34 is connected to the frame assembly 12 adjacent to the second window 17.

The frame assembly 12 includes the first frame portion 38 connected to the first decoy unit 14, the second frame portion 40 connected to the second decoy unit 16, a third frame portion 42 connected between front portions of the first frame portion 38 and the second frame portion 40, and a fourth frame portion 44 connected between rear portions of the first frame portion 38 and the second frame portion 40. Padded handle members 46 are connected to the third frame portion 42 and the fourth frame portion 44.

In accordance with another aspect of the invention, the animal decoy apparatus includes a life size form of a bovine animal. More specifically, one first decoy unit 14 or one second decoy unit 16 can be taken alone and used as a decoy without being associated with a frame assembly. Such a decoy unit taken alone can be used as a confidence decoy which can be used as a background decoy without having a hunter hide behind it. When not in use, such independent confidence decoys can be hung on the decoys which are attached to the frame assembly 12 so that they can be readily carried to and from the field.

In using the animal decoy apparatus 10 of the invention, a person or persons hide between the first decoy unit 14 and the second decoy unit 16. The person or persons can look out of the first window 15 and the second window 17 to observe wildlife. When a person is ready to shoot at wildlife, a gun 35 (or a camera or binoculars or the like) can be removed from a gun rack and aimed through a window. When it is desired to move the location of the animal decoy apparatus 10, the person or persons grasp the padded handle members 46 and carry the animal decoy apparatus 10 as they walk along the terrain, still shielded by the first decoy unit 14 and the second decoy unit 16. When the person or persons want to rest, they can sit on the first seat unit 26 or the second seat unit 30. The seat units can be detachable from the respective transverse struts.

The inventor has used an embodiment of animal decoy apparatus 10, simulating a cow, and has had tremendous results with geese and ducks. The ducks and geese have no fear of cattle when they are feeding in fields where cattle are present. As a result, the inventor has hidden within a bovine decoy apparatus and has sneaked to within 2 to 3 feet of waterfowl without the waterfowl becoming frightened and flying away.

The bovine decoy apparatus 10 can also be used as a deer ground blind during deer season. The bovine decoy apparatus 10 is a safe alternative to hiding behind a simulated deer decoy which may mistakenly be shot at by another hunter. Hunters and other people generally do not shoot at cattle.

A convenient way for moving the animal decoy apparatus 10 is for the person or persons to stand between the first transverse strut 24 and the second transverse strut 28 while carrying the animal decoy apparatus 10 and walking along the terrain.

The simulated bovine-like decoy units can come in a set wherein different members of the set simulate different bovine varieties or breeds. In this way, if the wildlife are accustomed to the presence of one particular variety of bovine, then that variety can be selected as a decoy for that particular wildlife.

The components of the bovine decoy apparatus of the invention can be made from inexpensive, durable, and lightweight metal (e.g. aluminum) and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved bovine decoy apparatus that is low in cost, relatively simple in design and operation, and which may advantageously be used to simulate an animal with a life size decoy. With the invention, a bovine decoy apparatus is provided which simulates an animal that is not generally hunted. With the invention, a bovine decoy apparatus is provided which simulates an animal that will not tend to scare off wildlife. With the invention, a bovine decoy apparatus is provided which does not scare off waterfowl. With the invention, a bovine decoy apparatus is provided which includes one or more seats for one or more persons to sit upon. With the invention, a bovine decoy apparatus is provided which includes one or more gun racks. With the invention, a bovine decoy apparatus is provided which is lightweight and portable so that it can be carried and moved by a person while still being used as a decoy.

With the bovine decoy apparatus of the invention, still additional advantages are realized. Hunters will no longer have to lay on the ground in the middle of a cornfield wearing white suits in the snow. In addition, hunters will no longer have to dig pit blinds in farmers field, which most farmers will not permit. Also, hunters will no longer have to make blinds out of square bales that look out of place or do not provide proper camouflage for waterfowl.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. An animal decoy apparatus, comprising:

a frame assembly, a first decoy unit connected to a first frame portion of said frame assembly, wherein said first decoy unit includes a window and said first decoy unit is in the form of an animal and a second decoy unit connected to a second frame portion of said frame assembly, wherein said first decoy unit and said second decoy unit are spaced apart from one another by third and fourth frame portions such that a person can position oneself between said first and second decoy units, at least one of the third and fourth frame portions having a padded handle member for grasping and moving the decoy apparatus, and a first transverse strut connected between said first decoy unit and said second decoy unit at a position below said frame assembly.

2. The apparatus of claim 1 wherein said first decoy unit and said second decoy unit are in a form of a life size animal.

3. The apparatus of claim 1 wherein said first decoy unit and said second decoy unit are in a form of a simulated bovine animal.

4. The apparatus of claim 3 wherein said simulated bovine animal includes:

a head portion, a body portion, and a tail portion.

5. The apparatus of claim 1, further including:

a first seat unit connected to said first transverse strut.

6. The apparatus of claim 1, further including:

a second transverse strut connected between said first decoy unit and said second decoy unit at a position below said frame assembly.

7. The apparatus of claim 6, further including:

a second seat unit connected to said second transverse strut.

8. The apparatus of claim 1, further including:

a first gun rack connected to said frame assembly.

9. The apparatus of claim 8 wherein said first gun rack is connected to said frame assembly adjacent to said first window.

10. The apparatus of claim 8, further including:

a second gun rack connected to said frame assembly.

11. The apparatus of claim 10 including a second window and wherein said second gun rack is connected to said frame assembly adjacent to said second window.

12. The apparatus of claim 1 wherein said second decoy unit includes a second window.

13. The apparatus of claim 1 wherein said frame assembly includes:

said first frame portion connected to said first decoy unit, said second frame portion connected to said second decoy unit, said third frame portion connected between front portions of said first frame portion and said second frame portion, and said fourth frame portion connected between rear portions of said first frame portion and said second frame portion.

14. The apparatus of claim 13, further including:

padded handle members connected to each of said third frame portion and said fourth frame portion.

* * * * *